United States Patent Office 3,480,856
Patented Nov. 25, 1969

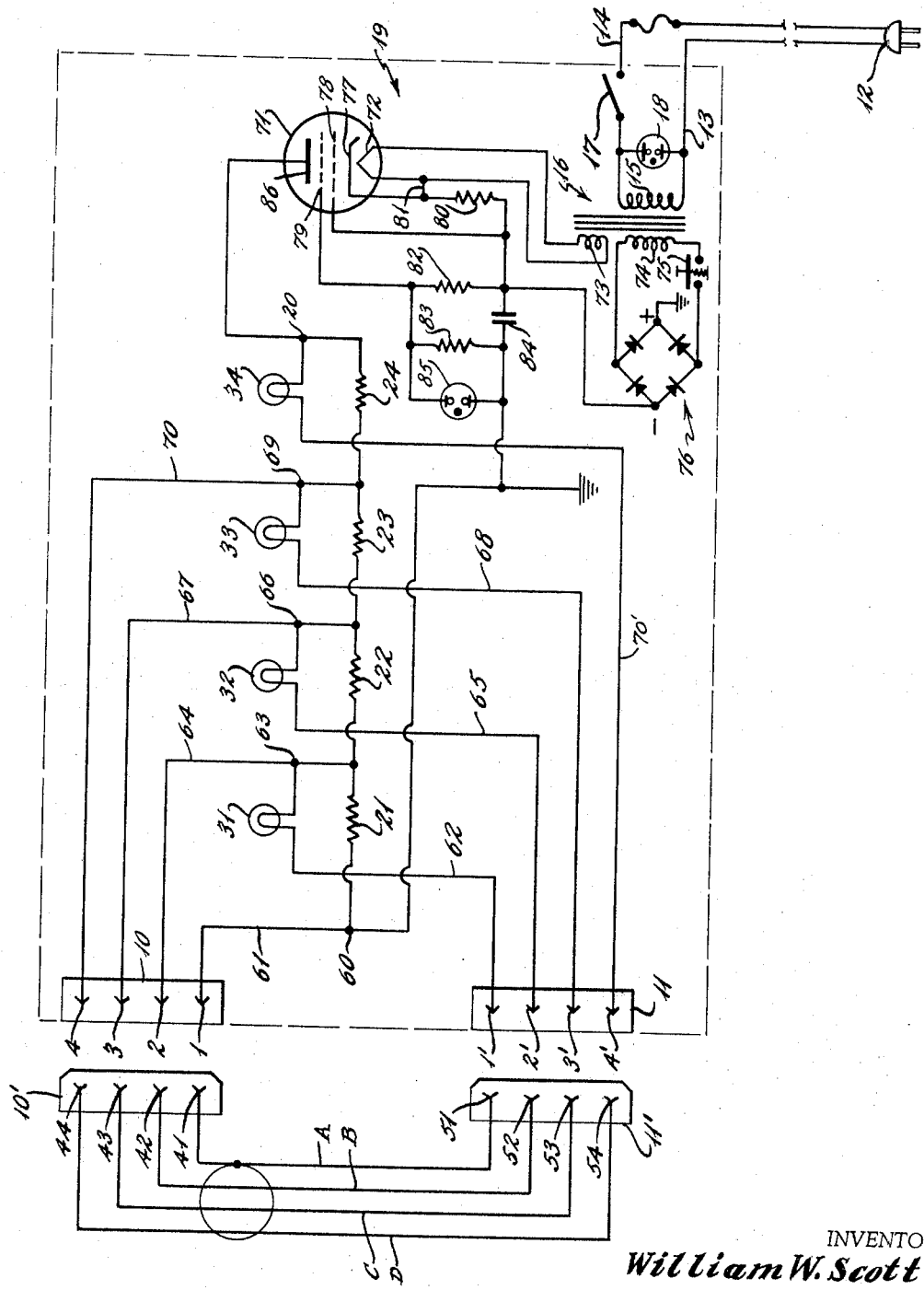

3,480,856
MULTI-WIRE CABLE CONTINUITY AND
SHORT TESTER
William W. Scott, Raleigh, N.C., assignor to Aerotron,
Inc., Raleigh, N.C.
Filed Nov. 6, 1967, Ser. No. 680,631
Int. Cl. G01r 31/02
U.S. Cl. 324—51  3 Claims

ABSTRACT OF THE DISCLOSURE

A continuity, short and transposition tester for multi-wire cable has a series loop of resistances, one for each wire, and a series connection of test indicators bridging the loop and each bridging an individual resistor through a wire of the cable.

This invention relates to testing and more particularly to the testing of electrical cables or wire harnesses having a multiplicity of wires.

Such cables are in widespread use and frequently have a large number of wires, sometimes in excess of 100. There has been a need for a relatively simple, low voltage tester which could simultaneously and instantly test all of the wires of the cable and indicate whether there is a break, whether there is a short between any of the wires, and whether any are transposed in their positions in the sockets or connectors.

Accordingly, it is an object of the invention to provide a continuity and short tester for a multiple-wire cable which is adapted for use with cables having large numbers of wires and which can be operated at relatively low voltage.

These and other objects of the invention become apparent with the following description in conjunction with the accompanying drawing in which the single figure is a diagram of an illustrative circuit utilizing the invention.

Briefly stated, the invention includes a tester with connectors for receiving the sockets or adaptors from the cable to be tested and with identifiable lead locations in the tester, an energizable series of resistors, one for each wire, and when connected with the cable providing a series connection of test means such as lamps across all of the resistances and each bridging an individual resistance with each wire such that open, short, or incorrectly wired circuits are readily identifiable.

With further reference to the drawing, a tester is illustrated having a pair of connectors 10, 11, connector 10 having leads (e.g. pins or pin receptacles) 1, 2, 3, 4 and the socket 11 having leads 1', 2', 3', 4'. While a 4-wire circuit is shown for illustrative purposes, the present invention is adapted for use with a large number of wires or circuits such as one hundred and fifty.

In the tester illustrated, a power plug 12 is adapted to be connected to an AC source of electrical energy and has leads 13, 14 to one side or winding 15 of a transformer 16. A switch 17 is provided in one of the leads 14 and an indicator or neon light 18 bridges the leads in order to indicate when the power circuit is "On." The transformer drives an automatic current limiting power supply circuit 19 which will be described later.

Supply circuit 19 is connected to point 20 of a closed loop which has resistors 21, 22, 23, 24 in series, one for each circuit to be tested. In order to provide an individual indication for each circuit being tested, indicators such as lamps 31, 32, 33, 34 are provided, one for each of the circuits, a resistor serving as load for each lamp. The lamps are connected so that when the cable to be tested is connected to the tester and all circuits are normal, the lamps are in series bridging all of the resistors and each lamp bridges its individual resistor through the circuit of the cable.

The cable has connectors 10' and 11' for connection with connectors 10 and 11 respectively. Adapter cables may be used if required. Connector 10' has leads 41, 42, 43, 44 for connection with leads 1, 2, 3, 4 of connector 10, and connector 11' has leads 51, 52, 53, 54 for connection with leads 1', 2', 3', 4' respectively of connector 11.

The wires between cable connectors 41, 51, 42, 52, 43, 53 and 44, 54 have been designated A, B, C, D respectively.

When the supply circuit is energized, this energizes the loop which is isolated from the AC source by the transformer. This connects the test lamps in series as follows: loop point 60, lead 61, lead 1, lead 41, wire A, lead 51, lead 1', lead 62, test lamp 31, point 63, lead 64 through leads including wire B, lead 65, test lamp 32, point 66, lead 67 through leads including wire C, lead 68, lamp 33, point 69, lead 70 through leads including wire D, lead 70', lamp 34, point 20 to supply circuit 19 back to point 60.

It will also be apparent that the foregoing circuit connects each lamp across a resistor, lamp 31 across resistor 21, lamp 32 across resistor 32, etc. The connection for lamp 31, for example, is point 63, lamp 31, lead 62, through wire A, lead 61 and point 60. Similarly the connection through lamp 32 is point 66, lamp 32, lead 65, through wire B, lead 64 to point 63.

Since the tester may be used for testing a large number of circuits, it is desirable that a power supply circuit with means for automatically limiting the current flow be employed. In the illustrated embodiment, this is provided by the supply circuit 19. This includes a power pentode or tetrode tube 71 having a filament 72 connected to a secondary transformer winding 73. The main secondary transformer winding 74 is connected through switch 75 and full-wave rectifier 76 to the cathode 77, control grid 78, and screen grid 79. The cathode 77 is connected through bias resistor 80 and is connected directly by jumper 81 to the filament in order to maintain these at the same potential. Voltage dividing resistors 82, 83, the latter connected to ground through filter capacitor 84, are connected to grid 79. A neon test light 85 for supply circuit "On" is connected across the resistor 83. The plate 86 of the tube 71 is connected to the point 20 of the tester loop circuit.

In the use of the invention, after connecting the cable to the tester, switch 17 is closed for the remainder of the test procedure. Switch 75 is then closed, causing the test lamps to glow. If all lamps glow with equal intensity, the cable is wired correctly. If one or more lamps fail to glow, this is an indication of an open or transposed, or of a short circuit for those lamps that are not lit. If a circuit is open to a lamp, it is completed through its associated resistor to the other lamps in the series. Instead of depending on judgment of lamp brilliancy, the user may prefer to substitute meters in place of the lamps.

Since the lamps are connected in series to the source of energy, it is preferable to use low voltage lamps in order to keep the overall voltage as low as possible. The resistors 21, 22, 23, 24 should have approximately the same DC resistance as the lamps 31, 32, 33, 34.

Should a short or an open circuit develop, this is indicated in a corresponding lamp and without damage to the remainder of the circuit, and thereby provides ready means of locating a source of difficulty, since the lamps are identified with the leads in the receptacle for the cable connectors or sockets. The tester may be used to test a cable having fewer than the number of wires for which the tester is designed, since any open external circuit is completed through a resistor.

While the tester is especially suited for the testing of cables or wire harnesses, it may also be used to check the wiring in electronic apparatus such as mobile radio telephones. This could be accomplished by adjusting the resistors of the tester so that all lamps (or meters) indicate the same flow when the apparatus is correctly wired. A different indication during testing would provide identification of the faulty circuit.

What is claimed is:

1. A continuity and short tester for simultaneously testing all of the wires of a multi-wire cable, said tester comprising first and second connector means, a plurality of corresponding conductors carried by each of said connector means, a first lead connecting the first conductor of said first connector means to one side of a supply of electrical energy, a plurality of second leads carried by said tester and adapted to interconnect said first and second connector means, one of said second leads being connected at one end to the first conductor of said second connector means and the opposite end being connected to the second conductor of said first connector means, the remaining second leads being connected at one end to the other conductors of said second connector means and connected at the opposite end to the other conductors of said first connector means, a third lead connected at one end to the last conductor of said second connector means and connected at the opposite end to the other side of said supply of electrical energy to complete a circuit when a cable is being tested, an independent electrical current flow indicator means connected in series with each of said second and third leads, a resistance means for each of said first and second leads connected at one end to its associated lead and connected at the opposite end to an adjacent lead to cause electrical energy to bypass any lead through which electrical energy cannot flow, and one of said resistance means adapted to bypass a portion of said third lead and connect a second lead to said other side of said supply of energy.

2. The invention of claim 1, in which each indicator means is a test lamp and has substantially the same resistance as the resistance means which it bridges.

3. The invention of claim 1, in which the means for supplying electrical energy includes a rectifier and current limiting means.

References Cited

UNITED STATES PATENTS

| | | | |
|---|---|---|---|
| 1,738,710 | 12/1929 | Jones | 324—66 |
| 1,977,703 | 10/1934 | Swartwout | 324—54 XR |
| 2,628,999 | 2/1953 | Bruyne | 324—54 XR |
| 2,814,774 | 11/1957 | Wong | 324—51 |
| 2,852,737 | 9/1958 | Wheeler | 324—54 XR |
| 2,912,648 | 11/1959 | Wales | 324—51 XR |
| 3,032,708 | 5/1962 | Wise | 324—51 XR |
| 3,182,253 | 5/1965 | Dorsch et al. | 324—51 |
| 3,378,764 | 4/1968 | Peltz et al. | 324—51 |

FOREIGN PATENTS 559,908   7/1958   Canada.

GERALD R. STRECKER, Primary Examiner

U.S. Cl. X.R.

324—4